Patented Feb. 8, 1949

2,461,007

UNITED STATES PATENT OFFICE 2,461,007

PROCESS FOR REFINING TURPENTINE

George H. Splittgerber, Whiting, Ind., assignor to Sinclair Refining Company, New York, N. Y., a corporation of Maine No Drawing. Application June 6, 1946, Serial No. 674,931

2 Claims. (Cl. 260—675.5)

My invention relates to a method for removing oxygen compounds from turpentine, by which term I mean to embrace not only turpentine itself, but also turpentine fractions, including turpentine oil and the material sold under the name "pinene 111," which is a fractionated turpentine reported as containing about 92% alpha pinene, 4-5% camphene, and 3-4% dipentene and other terpenes.

Copending application, Serial No. 494,687 of Robert L. May, filed July 14, 1943, describes a phosphorus- and sulfur-containing addend for mineral and lubricating oils, which is obtained by reaction of a phosphorous sulfide with turpentine, while May applications, Serial Nos. 545,193 and 545,195, both filed July 15, 1944, now U. S. Patents Nos. 2,409,877 and 2,409,878, respectively, and May Patents Nos. 2,392,252 and 2,392,253, both of which issued on January 1, 1946, describe addends produced by further reacting the phosphorus sulfide-turpentine reaction product or a substance derived therefrom with other materials.

All of these addends are active anti-oxidants and effectively repress the deterioration of lubricating oils but, unfortunately, they impart a very disagreeable onion-like odor thereto. This odor, it has recently been discovered, derives from oxygen impurities naturally present or formed in the turpentine used in the preparation of the phosphorus sulfide-turpentine reaction product. The oxygen impurities apparently react with the phosphorus sulfide, forming sulfur derivatives which are directly responsible for the odor. In the case of the addend of the first of the May applications, above identified, the odor is usually not noticeable in the addend itself but develops following addition of the addend to the lubricating oil.

According to the present invention, I remove or inactivate a substantial portion of these oxygen compounds before the turpentine is reacted with the phosphorus sulfide and I thereby materially improve the odor of compounded oils containing the addends. I accomplish this by a process which comprises heating the turpentine over barium oxide.

I am not certain as to the mechanism of the reaction involved in my process but it appears that the barium oxide causes the polymerization of some of the oxygen impurities and that barium derivatives of other of the oxygen impurities are formed which do not react with phosphorus sulfide.

In the practice of my process, I generally heat the turpentine in the presence of the barium oxide to reflux temperature and retain it at such temperature for about 24 hours. Thereafter, I may simply distill the mixture, taking, as product of the process, a fraction boiling within a predetermined boiling range or, alternatively, I may take, as the product, the clear liquid obtainable by filtration and decantation of the residue following a distillation carried out at a temperature up to the boiling range of the product.

The following examples submitted in illustration of my invention are not to be construed as in any way restrictive of the scope thereof:

*Example 1*

In a blank test, a sample of pinene 111 was distilled to separate a fraction boiling at 156–157° C. 544 grams (4 moles) of this material was heated on a sand bath in a three liter, three-necked stirred flask in which a nitrogen atmosphere was maintained. After the temperature reached 250° F. the source of heat was removed and 222 grams, 1 mole, of phosphorus pentasulfide was added in small increments over a 90 minute period, the temperature of the exothermic reaction being thereby maintained at about 275° F. After the addition of the last increment of the phosphorus pentasulfide, the reaction was continued for 12 hours at 275° F., following which 176 grams, 1 mole, of p-cyclohexylphenol was added. After further reaction for 10 hours at 275° F., the mixture was blended with 1022 grams of a low viscosity Mid-Continent oil. 2¼ parts by weight of the resulting oil concentrate, after filtration, was mixed with 97¾ parts by weight of a Mid-Continent SAE 20 motor oil. This blend had an offensive onion-like odor suggestive of mercaptans.

*Example 2*

A 1000 gram sample of the same pinene 111 was refluxed for 24 hours over barium oxide and then distilled. That portion of the distillate boiling at 156–157° C., when employed according to the procedure of Example 1, gave a blend which was relatively odorless. Twenty grams of barium oxide was used in the treatment of pinene 111.

Apart from the fact that it improves the odor of the blends, my process is advantageous in that the addend is rendered more thermally stable. Thus, when the phosphorus sulfide-turpentine reaction product, prepared with turpentine which has been treated according to my process, is heated under reflux at 350° F. for as long as 16 hours, no decomposition, as would be indicated by the formation of a precipitate, occurs. On the other hand, when the reaction product is prepared, as heretofore, with turpentine from which oxygen impurities have not been removed, a precipitate is formed in two hours and the precipitate progressively increases in quantity on further heating.

Where the turpentine to be processed according to my invention has a high peroxide content, it is advantageous to subject it to a pretreatment with caustic soda or other alkali. In the pretreatment as effected with caustic soda, I generally use about 1 part by weight of 40% aqueous caustic for each 20 parts of the turpentine, refluxing the mixture for a period of some 8–10 hours. Contrary to what might be expected, the alkali treatment alone will not remove oxygen compounds responsible for the objectionable odor in the blends. Another surprising fact is that calcium oxide when substituted for barium oxide in my process apparently does not react in any way with the oxygen impurities since blends produced according to Example 1, using pinene 111 which had been previously refluxed over calcium oxide, were just as odoriferous as blends prepared with untreated pinene 111.

Following the purification treatment of the invention, an oxidation inhibitor, such as hydroquinone or pyrogallol may be added to the turpentine in order to prevent the subsequent formation of oxygen impurities.

I claim:

1. A process which comprises heating turpentine over barium oxide to reflux temperature of the turpentine to remove or inactivate oxygen impurities contained in the turpentine.

2. A process which comprises refluxing a turpentine fraction containing alpha pinene in a predominant proportion over barium oxide to remove or inactivate oxygen impurities present in the fraction.

GEORGE H. SPLITTGERBER.

REFERENCES CITED

The following references are of record in the file of this patent:

UNITED STATES PATENTS

| Number | Name | Date |
|---|---|---|
| 1,600,143 | Sherk | Sept. 14, 1926 |

FOREIGN PATENTS

| Number | Country | Date |
|---|---|---|
| 36,835 | France | May 6, 1930 |